(12) United States Patent
Harris et al.

(10) Patent No.: US 10,437,834 B2
(45) Date of Patent: Oct. 8, 2019

(54) DISPLAYING AGGREGATED CONNECTION DATA USING A DATABASE SYSTEM

(71) Applicant: salesforce.com, inc., San Francisco, CA (US)

(72) Inventors: Parker Harris, San Francisco, CA (US); Rajaram Satyanarayanan, San Jose, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/189,516

(22) Filed: Nov. 13, 2018

(65) Prior Publication Data

US 2019/0188303 A1 Jun. 20, 2019

Related U.S. Application Data

(63) Continuation of application No. 15/268,201, filed on Sep. 16, 2016, now abandoned, which is a
(Continued)

(51) Int. Cl.
*G06F 16/248* (2019.01)
*G06F 16/2457* (2019.01)
(Continued)

(52) U.S. Cl.
CPC ...... *G06F 16/24575* (2019.01); *G06F 16/248* (2019.01); *G06F 16/9535* (2019.01);
(Continued)

(58) Field of Classification Search
None
See application file for complete search history.

(56) References Cited

U.S. PATENT DOCUMENTS 5,577,188 A 11/1996 Zhu
5,608,872 A 3/1997 Schwartz et al.
(Continued)

FOREIGN PATENT DOCUMENTS

WO 2012/0129771 10/2012

OTHER PUBLICATIONS

U.S. Non-Final Office Action dated Aug. 21, 2015, issued in U.S. Appl. No. 13/743,895.
(Continued)

*Primary Examiner* — Wilson Lee
(74) *Attorney, Agent, or Firm* — Weaver Austin Villeneuve & Sampson LLP

(57) ABSTRACT

Disclosed are database systems and related methods, apparatus, systems, and computer program products for displaying aggregated connection data. A database storing data objects identifying connection events may be maintained. An indication of a first connection event between first and second users may be processed. A record of the first connection event may be stored in the database. The record of the first connection event may be one of a plurality of records of connection events between the first and second users. The plurality of records may be processed to determine a plurality of levels of interaction strength between the first and second users. An interaction strength presentation may be displayed in a user interface on a display of a first device associated with the first user.

20 Claims, 9 Drawing Sheets

Social Profile of a User

Related U.S. Application Data continuation of application No. 13/743,895, filed on Jan. 17, 2013, now abandoned.

(60) Provisional application No. 61/579,098.

(51) Int. Cl.
*H04W 4/21* (2018.01)
*H04W 76/14* (2018.01)
*H04W 12/06* (2009.01)
*G06F 16/9535* (2019.01)
*H04L 12/58* (2006.01)

(52) U.S. Cl.
CPC .............. *H04W 4/21* (2018.02); *H04W 12/06* (2013.01); *H04W 76/14* (2018.02); *H04L 51/32* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |

(56) References Cited

U.S. PATENT DOCUMENTS

| | | |
|---|---|---|
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0046709 A1 | 3/2006 | Krumm et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0157473 A1 | 6/2009 | Belz et al. |
| 2009/0177744 A1 | 7/2009 | Marlow et al. |
| 2011/0072052 A1 | 3/2011 | Skarin et al. |
| 2011/0213785 A1 | 9/2011 | Kristiansson et al. |
| 2011/0218958 A1 | 9/2011 | Warshaysky et al. |
| 2011/0238755 A1 | 9/2011 | Khan et al. |
| 2011/0247051 A1 | 10/2011 | Bulumulla et al. |
| 2011/0276396 A1 | 11/2011 | Rathod |
| 2012/0042218 A1 | 2/2012 | Cinarkaya et al. |
| 2012/0233137 A1 | 9/2012 | Jakobson et al. |
| 2012/0271722 A1 | 10/2012 | Juan et al. |
| 2012/0290407 A1 | 11/2012 | Hubbard et al. |
| 2013/0046770 A1 | 2/2013 | Tseng |
| 2013/0066821 A1 | 3/2013 | Moore et al. |
| 2013/0185654 A1 | 7/2013 | Harris et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0012918 A1 | 1/2014 | Chin et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0319199 A1* | 11/2015 | Yanashima ........... A63F 13/795 709/204 |
| 2017/0006446 A1 | 1/2017 | Harris et al. |
| 2017/0173476 A1* | 6/2017 | Schindler ................ A63F 13/87 |
| 2018/0295090 A1* | 10/2018 | Friedland ............... G06Q 50/01 |
| 2019/0034963 A1* | 1/2019 | George ............. G06Q 30/0246 |

OTHER PUBLICATIONS

U.S. Final Office Action dated Apr. 8, 2016, issued in U.S. Appl. No. 13/743,895.

U.S. Pre-Interview First Office Action dated Sep. 17, 2018, issued in U.S. Appl. No. 15/268,201.

"Google Plus Users", Google+Ripples, Oct. 31, 2011 [retrieved on Feb. 21, 2012 from Internet at http://www.googleplusers.com/google-ripples.html], 3 pages.

* cited by examiner

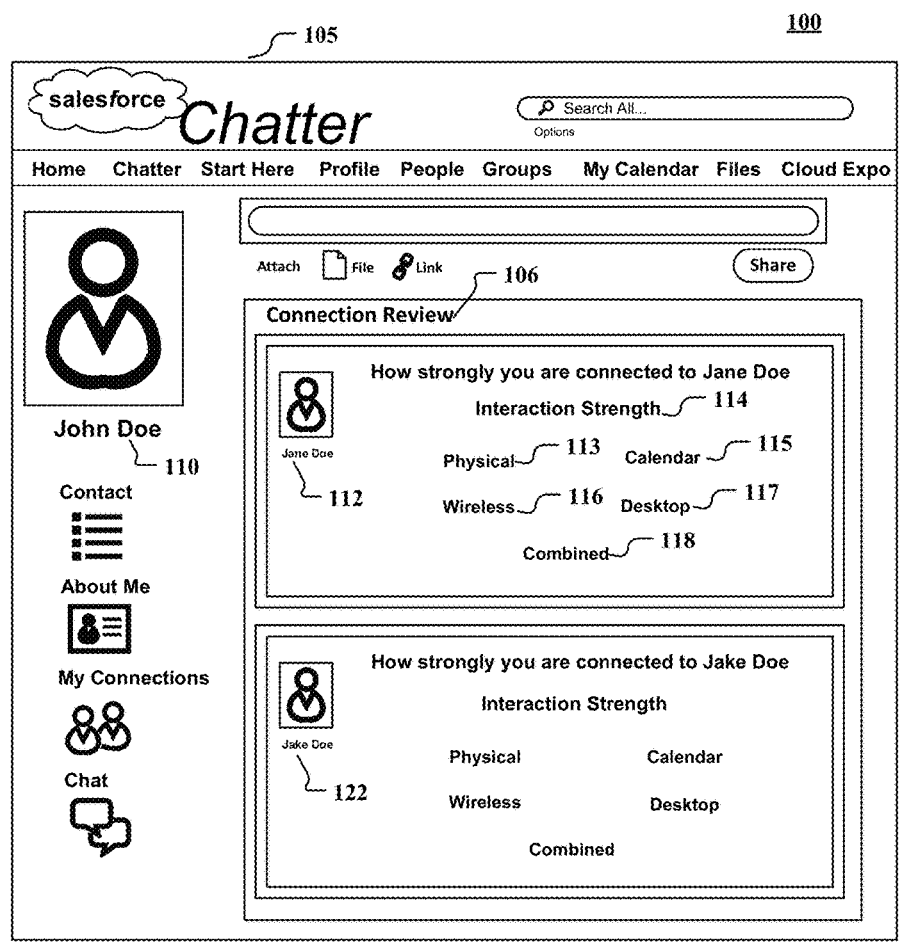
Fig. 1 – Social Profile of a User

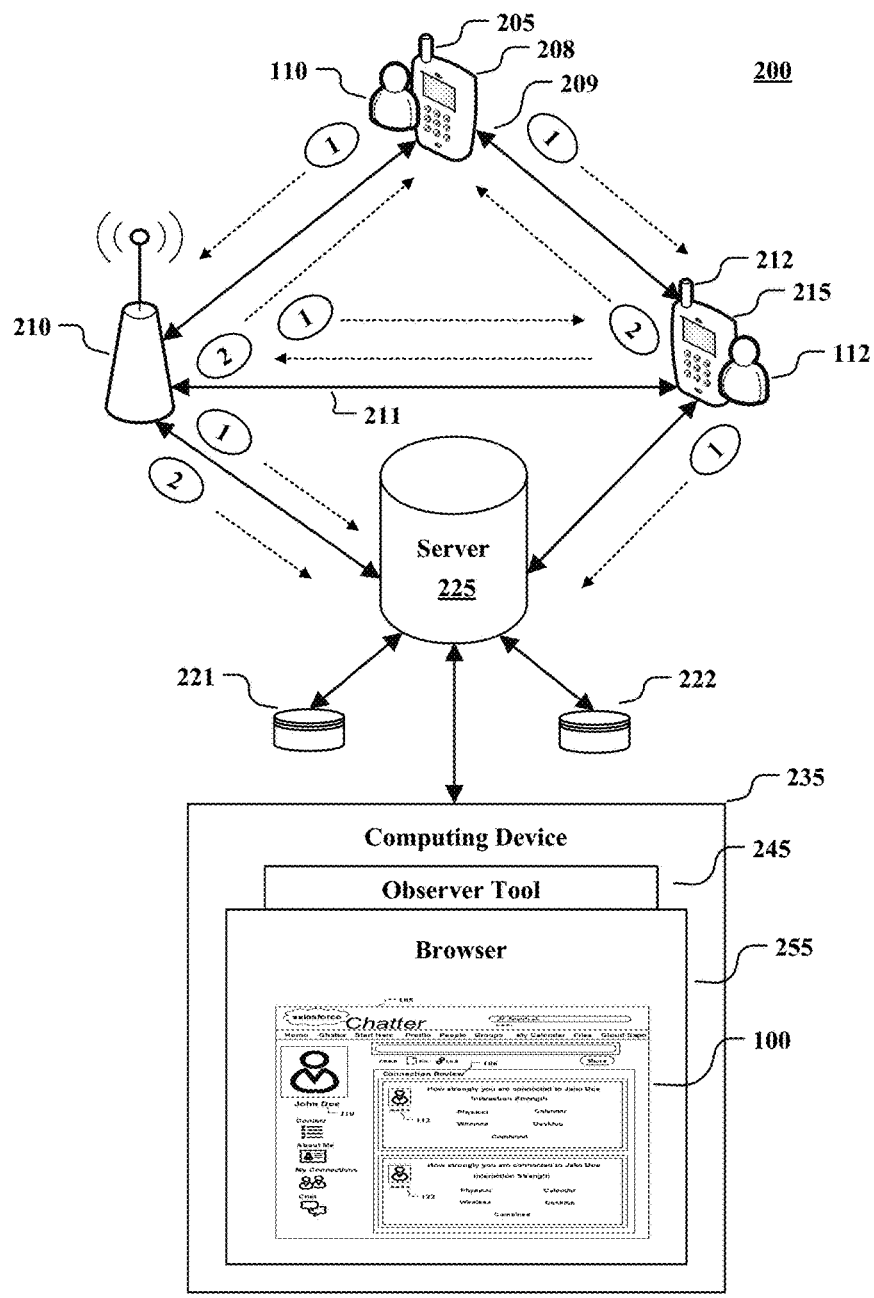
Fig. 2 – Online Social Network Environment

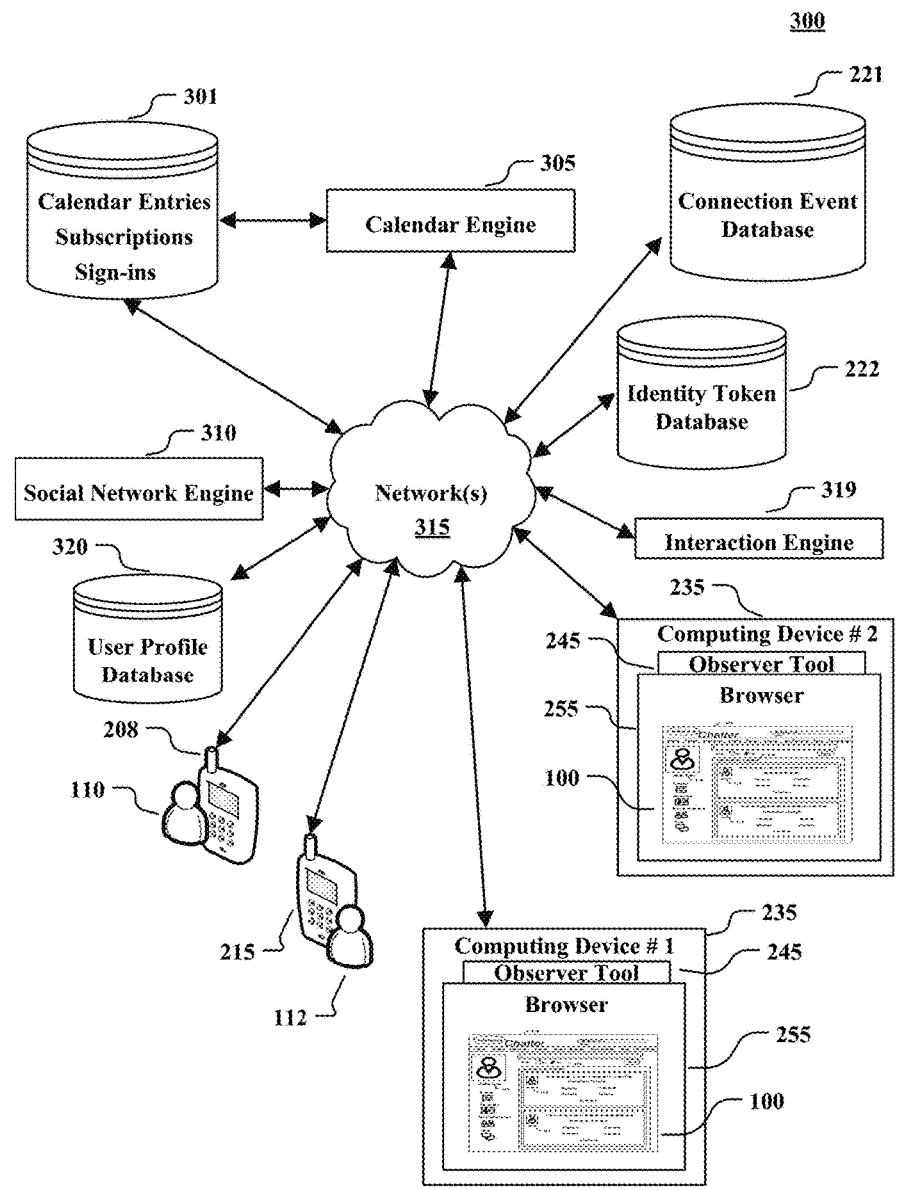
Fig. 3 – Representative System for Mapping Relevant Personal Connections

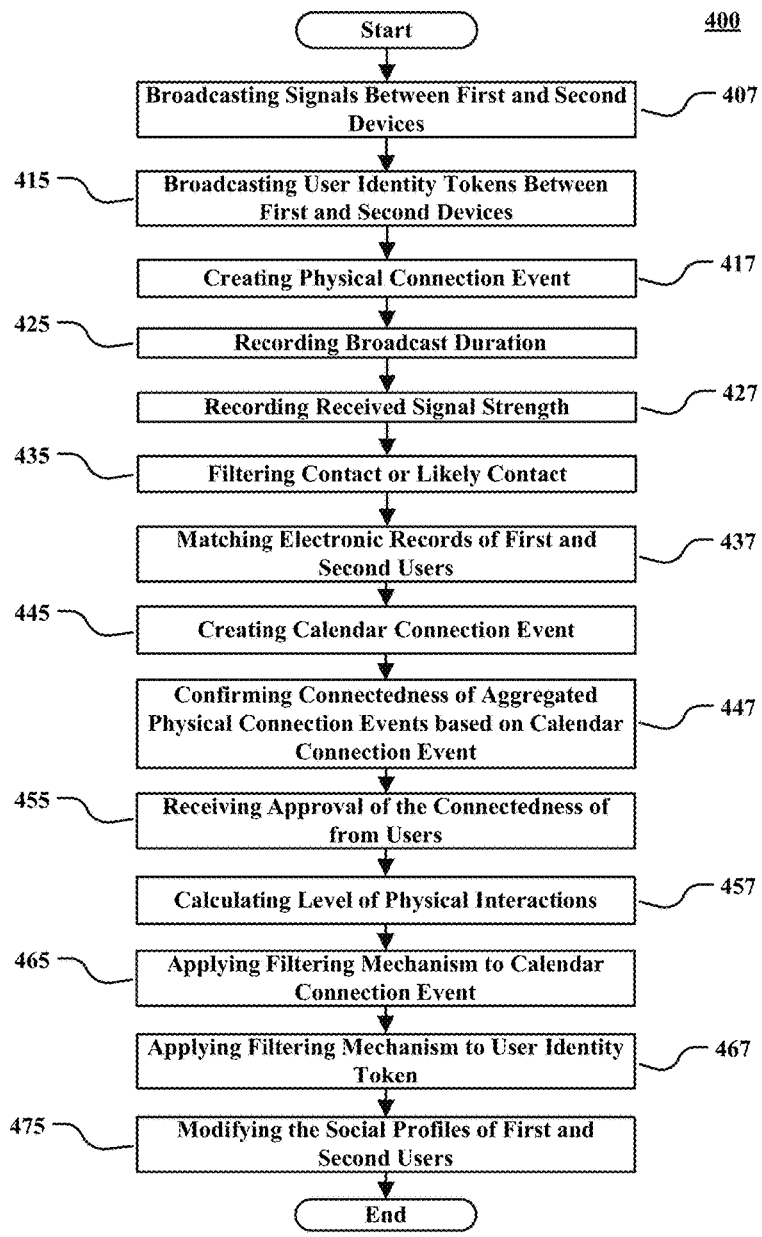
Fig. 4 – Flow Chart of Calculating Level of Physical Interactions in Peer-to-Peer Connection

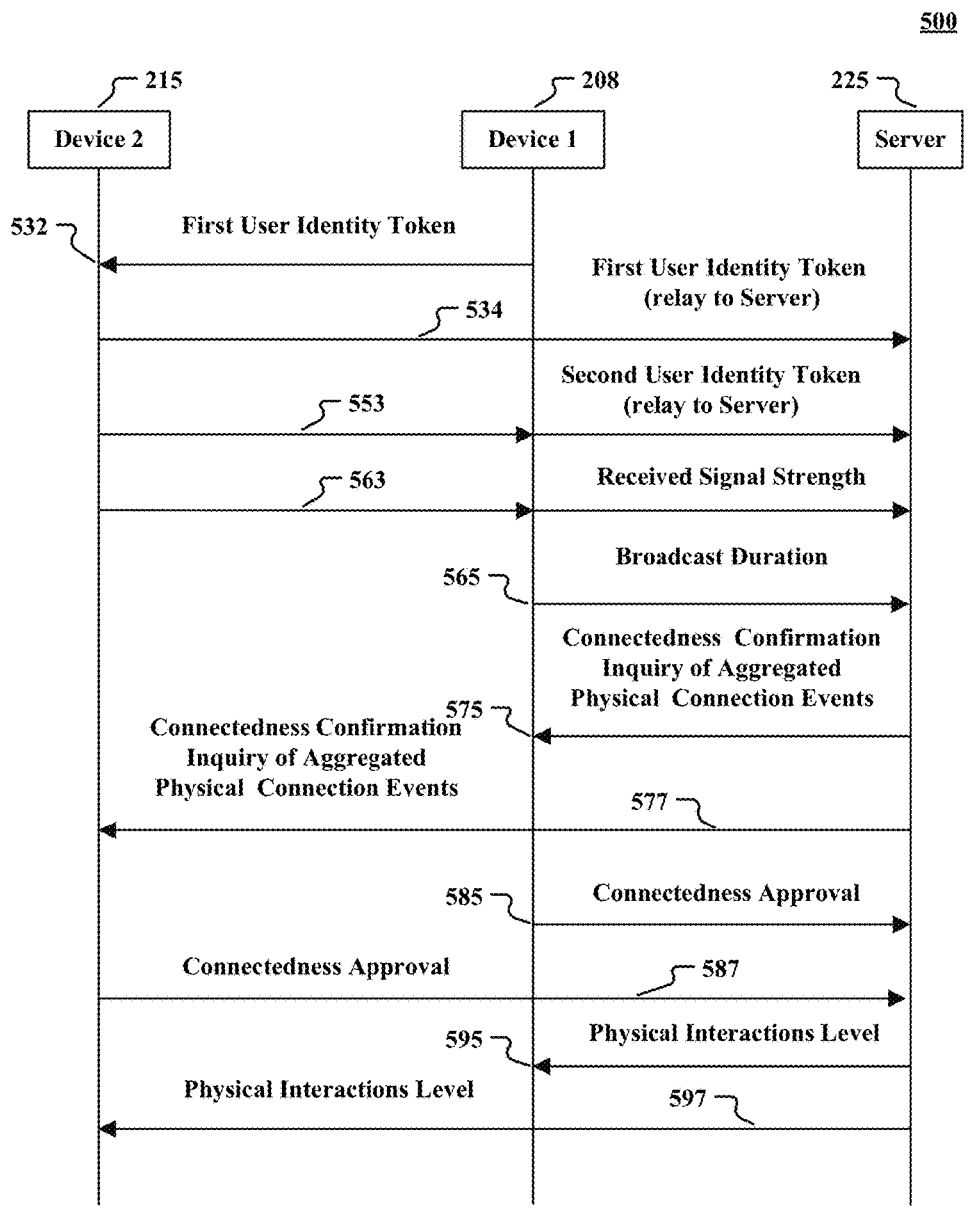
Fig. 5 – Message Sequence Chart of Calculating Physical Interactions Level in Peer-to-Peer Conneciton

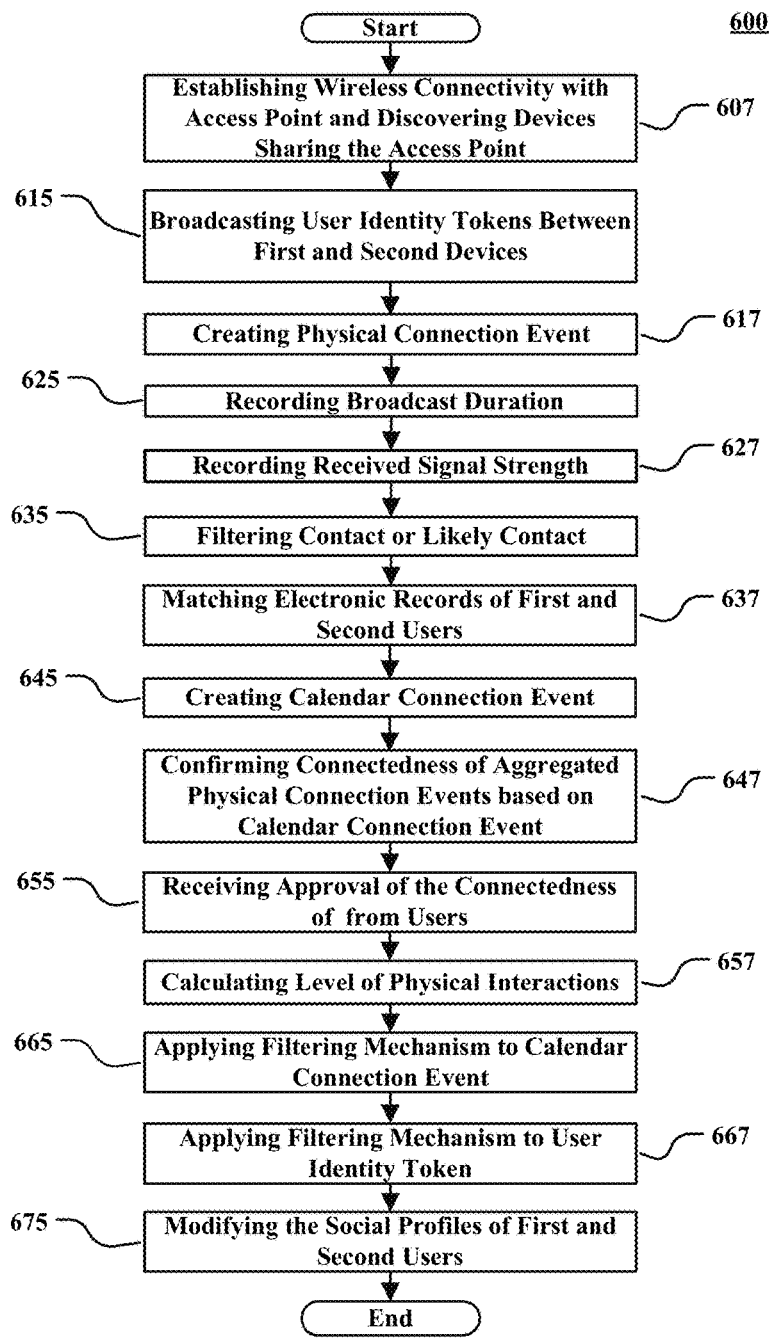
Fig.6 – Flow Chart of Calculating Level of Physical Interactions in WLAN Connection

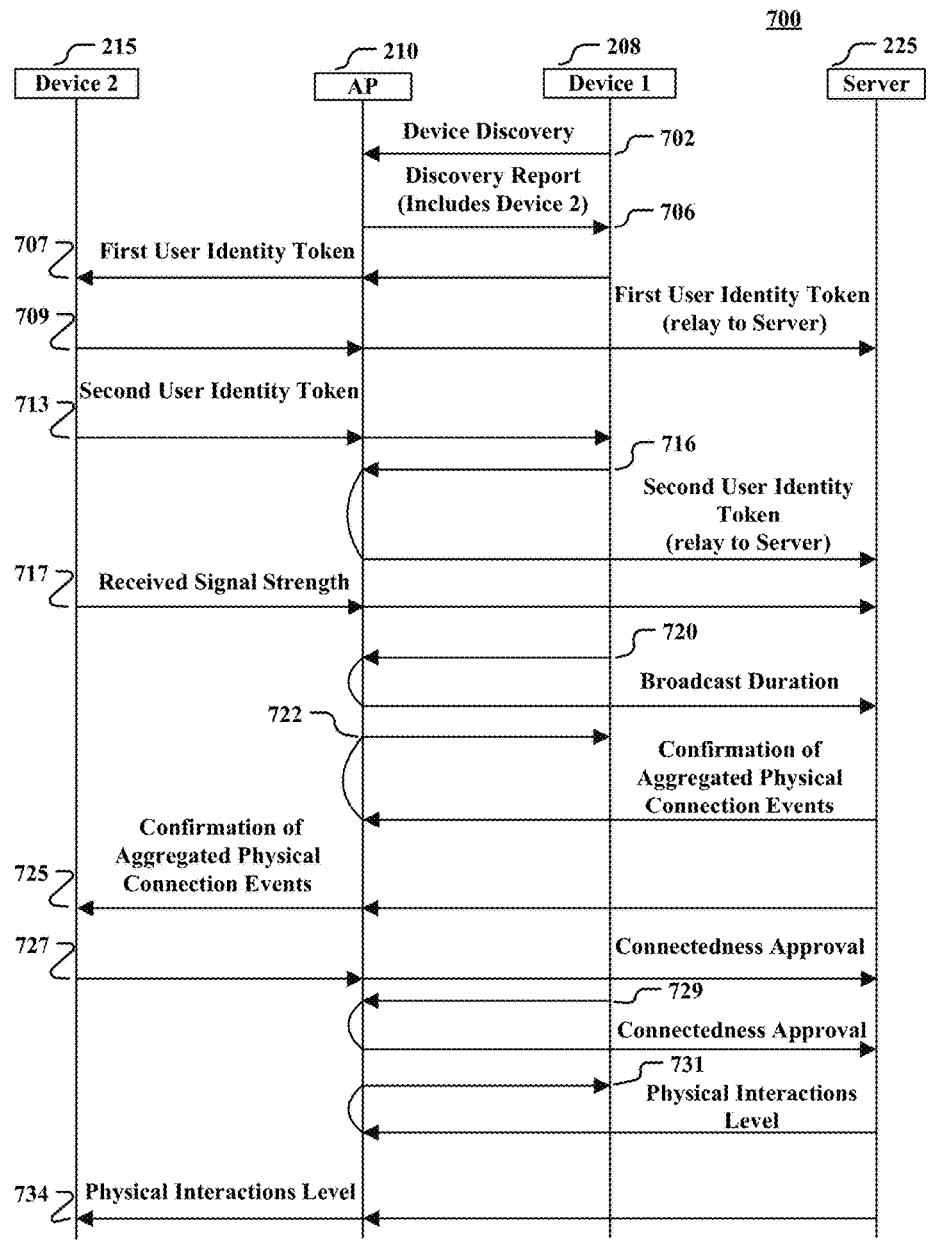
Fig. 7 – Message Sequence Chart of Calculating Physical Interactions Level in WLAN Connection

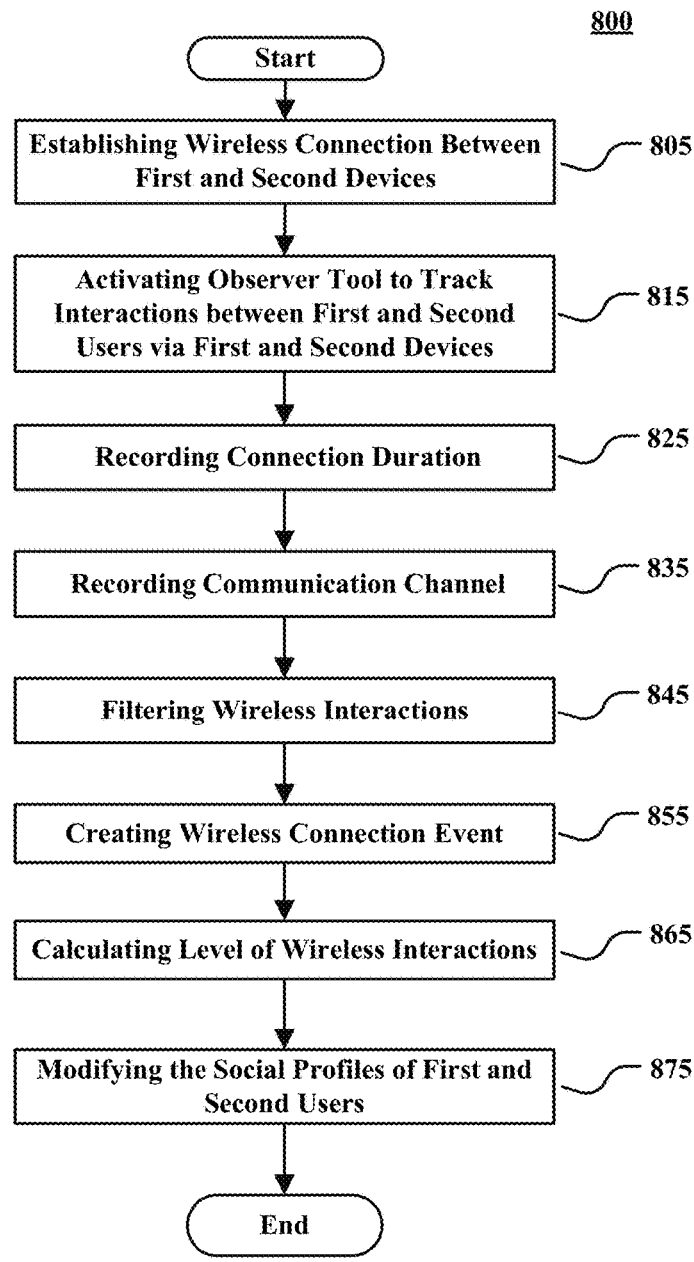
Fig. 8 – Flow Chart of Calculating Wireless Interactions Level

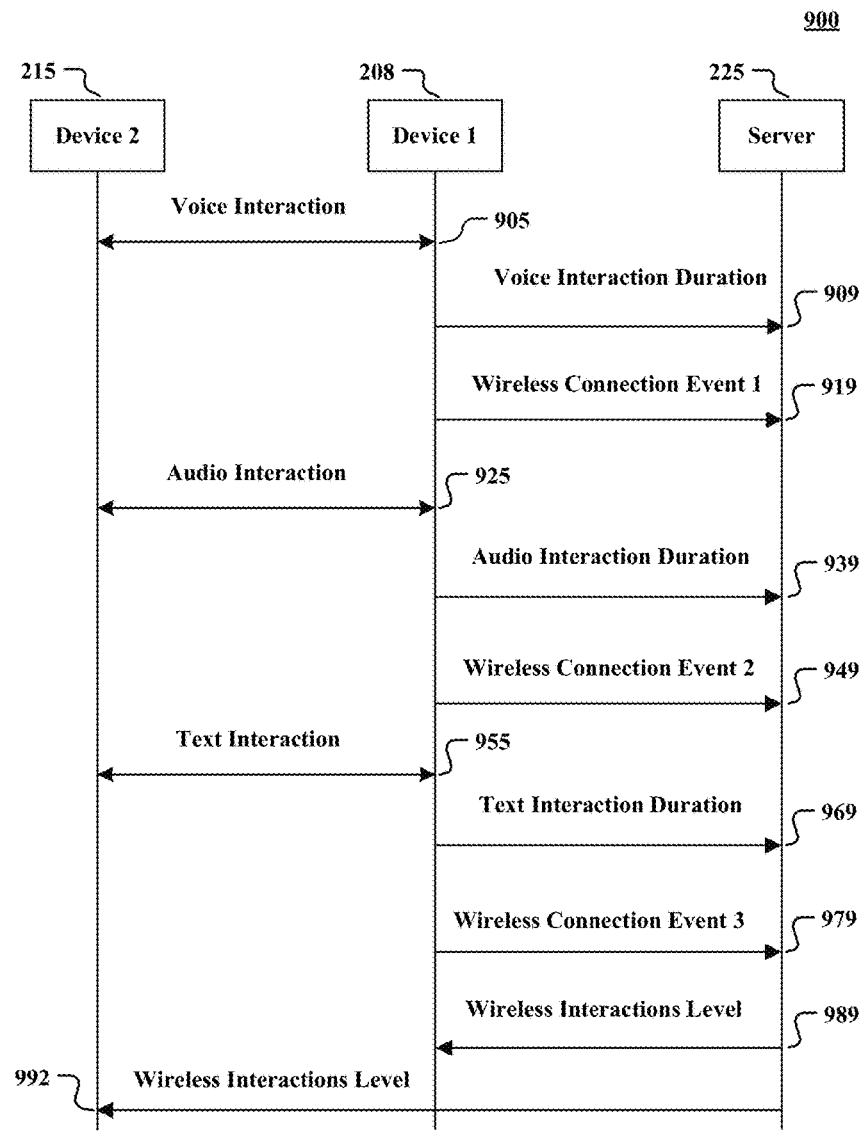
Fig. 9 – Message Sequence Chart of Calculating Wireless Interactions Level

DISPLAYING AGGREGATED CONNECTION DATA USING A DATABASE SYSTEM

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The technology disclosed relates to calculating interaction strengths for physical interactions, scheduled physical interactions and wireless interactions between users of online social networks. In particular, it relates to determining direct contact or likely contact between users of online social networks based in part on their mobile communication devices. This determination can be used to score interactions that take place outside the social network for interaction strengths.

Online social networks have become common tools through which users interact and share information across various channels including as messages, e-mails, videos, chat rooms, blogs, etc. The inherent value of an online social network is rooted in the value of a users' connections to other users and objects. Typically, most of this value is derived from actions performed and captured on the social network websites. For example, a user may actively follow, like, or comment on another user or object in order to integrate that user or object with the user's social network. Currently, actions external to the online social network cannot be used to influence the relationship between users or between users and objects on an online social network.

User interactions outside of the context of an online social network are not captured or represented in a meaningful way by the social network. For instance, a physical interaction with another user such as attending a meeting and conversing, or collectively viewing a presentation, contributes to a social network. However, there may not be any explicit interaction through the social network, resulting in online social networks not being able to capture such real-world interactions.

An opportunity arises to provide users of an online social network with mechanisms and methods for mapping connections with other relevant users of the online social network. In particular, the technology disclosed allows users of an online social networks to capture real-world interactions with other users and represent them on the online social network. Improved representation and analysis of inter-user relationships may result.

SUMMARY

The technology disclosed relates to calculating interaction strengths for physical interactions, scheduled physical interactions and wireless interactions between users of online social networks. In particular, it relates to determining direct contact or likely contact between users of online social networks based in part on their mobile communication devices. This determination can be used to score interactions that take place outside the social network for interaction strengths.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 illustrates one implementation of a graphical user interface representing a social profile associated with a user.

FIG. 2 illustrates one implementation of an exemplary online social network environment.

FIG. 3 illustrates one implementation of an example system that allows mapping of relevant personal connections.

FIG. 4 is a flow chart of one implementation of calculating level of physical interactions between first and second users using first and second devices operating in peer-to-peer mode.

FIG. 5 is a message exchange chart of one implementation of some elements of FIG. 4.

FIG. 6 is a flow chart of one implementation of calculating level of physical interactions between first and second users using first and second devices participating in a wireless local area network.

FIG. 7 is a message exchange chart of one implementation of some elements of FIG. 6.

FIG. 8 is a flow chart of one implementation of calculating level of wireless interactions between first and second users using first and second devices.

FIG. 9 is a message exchange chart of one implementation of some elements of FIG. 8.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Physical and wireless interactions between users or between users and objects can be used to calculate and/or build the users' social network. For example, the frequency of interaction between users can be used to measure the interaction strength of their relationship. In some implementations, actions external to the online social network can be used to affect the interaction strength of users in an online social network.

Interaction strength information can be shared to the extent allowed by settings. All social network users, or only those users who follow the first user, or only the first user can view the interaction strength on first user's profile page. Interaction strength can be based on metrics, such as the number of interactions within a defined time period (i.e., frequency), the length of interaction, and the like. This interaction strength calculation can consider interactions outside of the online social network, such as interactions observed with a CRM system. A first user's interactions with a second user recorded in the CRM system can be provided to the social network and used to determine interaction strength. In yet another implementation, interaction strength can also be based upon multiple social network interactions.

Physical interactions are captured based on wireless interactions between mobile communication devices of two users. Use cases for peer-to-peer communication between the respective mobile devices and simultaneous interaction with a shared access point are described. These use cases have in common physical proximity of users. The proximity of mobile communication devices is used as a proxy for user interaction or at least for shared user experiences due to physical proximity.

Scheduled physical interactions are captured from calendar entries, event subscriptions, sign-ins and the like that place two users at the same event. The scheduled physical interactions may be analyzed when the user's respective privacy settings allow. Analysis of schedule physical interactions may be triggered by another interaction event, thereby reducing the potential intrusiveness of analyzing calendars.

Wireless communication interactions outside the social network can be monitored using observer software residing on respective mobile communication devices. The observer software can monitor video, audio and text communications channels that are out of band from the social network.

In each of these use cases, connection events such as physical connection event, calendar connection event or wireless connection event can be created and stored in a database. A physical connection event can be triggered by reception of a user identity token. The receiving device can record the duration and strength of the signal that broadcasted the user identity token. It also can record the number of token broadcasts received and optionally their timing or continuity. Similarly, a calendar connection event is a memory update caused by a find or match of calendar related electronic records of two users indicating their co-attendance at an event. Likewise, a wireless connection event is registered at a server when two users communicate with each other outside the social network using their respective wireless devices.

Moreover, the connection events can be processed to determine connectedness scores for pairs of users. Connectedness scores can be made available to users for their own connections and to permitted viewers Actions performed by a user outside the social network can be analyzed from browser cookies or the user's browser history. A user can use permission levels to set the level of access to his browser history or to real-time browser actions. For purposes of this example, the actions of the user can be accessed or tracked by an "observer tool."

Once the observer tool is activated, either by the user or an administrator having sufficient privileges, the actions of the user can be analyzed. The observer tool can see that the user interacts with a number of other users or objects on the social network, regardless of whether the user is following those other users or objects on the social network. Interactions can include, but are not limited to, viewing a profile page of the user or object, commenting on a post mentioning the user or object, initiating a chat session with the user, sending a message to the user, and the like. If the first user is not following or is otherwise not connected to the user or object with which he or she is interacting, the observer tool can trigger an action to suggest that the first user follow the user or object, or the observer tool can trigger that the user or object be automatically followed by the first user based upon a configurable number of interactions.

In one example, a first user can meet a second user at a conference, where electronic interactions between users' respective communication devices can confirm proximity and interaction between the users. For instance, each device may broadcast identity tokens once per minute. Each device may receive ten tokens in ten minutes with a received signal strength indicator for peer-to-peer wireless channel that suggests close physical proximity. Such interactions can affect the interaction strength of the second user in the first user's social network, and vice-versa. Alternatively or additionally, calendar entries common to both the users can contribute to an interaction strength for the two users.

In another example, a second user can be excluded from interaction strength calculation. The first user may not want to measure the extent of his or her relationship with the second user. However, if the second user provides an incentive, such as a piece of contact information, access, or other object or portion of an object to the first user, the first user may include the second user in the interaction strength calculation.

The technology disclosed relates to online social networks for use in a computer-implemented system. The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Social Profile

FIG. 1 illustrates one implementation of a graphical user interface 100 representing a social profile 105 associated with a user 110. In particular, FIG. 1 illustrates the social profile 105 of user John Doe 110 on an online social network 200 such as Salesforce's Chatter. The social profile 105 can include the user's name, contact information, professional information, and/or picture. In addition, the social profile 105 can list other users connected with John Doe 110 including Jane Doe 112 and Jake Doe 122.

In some implementations, the social profile 105 can include a connection review tab 106 that displays interaction strength 114 of John Doe 110 with other users such as Jane Doe 112 and Jake Doe 122. The interaction strength 114 can be based on physical interactions 113, calendar events 115, wireless interactions 116, desktop history 117, combined interactions 118, and the like, which can be displayed as separate individual tabs. The interaction strength 114 can be indicated through scoring functions, point system, meters, highlighting or other graphical enhancements, ordering, mouseovers, or indicators. In other implementations, selecting one of these tabs can open a new view or browser window elaborating the selected tab. Another example can include a list created by John Doe 110 to view his interaction strength with specific users.

Online Social Network

FIG. 2 illustrates one implementation of an online social network environment 200. The users 110 and 112 of online social network environment 200 can use wireless devices 208 and 215 communicating through peer-to-peer connection 209 or simultaneously interacting with a shared access point 210 (AP) configured on a wireless local area network 211 (WLAN).

The devices 208 and 215 can include a number of components, the controlling components being processors. Processors can include one or more digital signal processor (DSP), microprocessor, microcontroller, central procession unit (CPU) or graphics processing unit (GPU), application specific integrated circuit (ASIC), reduced instruction set computing (RISC) or field-programmable gate array (FPGA) or a combination of these processor types. Processors can control the overall operations of the devices 208 and 215. In addition to their operating system functions, they can execute software applications on the devices 208 and 215. The processors can interact with other components of the respective devices 208 and 215 such as radio frequency (RF) transceivers, device interfaces, memory units, etc.

The communication related functions of the devices 208 and 215 are performed by the RF transceivers. The RF transceivers can transmit/receive RF signals through antennas 205 and 212. For transmission, the RF transceivers can perform data channel-coding and spreading. In case of reception, they can convert received RF signals into baseband signals and perform de-spreading and channel decoding on the baseband signals to recover the original data.

Additionally, RF transceivers can search for neighboring RF transceivers and perform a discovery or pairing process. The RF transceivers in conjunction with the processors can—function as a signal measurement unit for determining the strength of a received signal or received signal strength indication (RSSI), implement a timer for determining the duration of a connection or broadcast, and place timestamps on the transferred signals for recording the date and time of transmission or reception.

The input/output related functions of the devices 208 and 215 are executed by device interfaces. The device interfaces can comprise of various input/output sub-systems such as a display, keyboard, microphone, speaker, serial port, etc. In some implementations, the devices 208 and 215 can include one or more device interfaces for providing users access to various system components and receiving information.

The memory units such as Read Only Memory (ROM), Random Access Memory (RAM), flash memory and disk drive among others, can provide persistent or volatile storage. In some implementations, the memory units can store—micro-codes of a program for processing and controlling device operations, temporary data generated during program executions, reserved data, and data transmitted and received by the devices 208 and 215.

User Identity Tokens

Snippets of data, referred to as "user identity tokens" 1 and 2 can be used for discovery of respective users 110 and 112 of the online social network 200. In some implementations, user identity tokens 1 and 2 can include encrypted data unique to users 110 and 112. In addition, the user identity tokens 1 and 2 can include the social identities of the users 110 and 112 setup on the online social network 200. In other implementations, the server 225 can generate encrypted "user identifier keys" unique to the users of online social network 200. Users 110 and 112 can anonymously broadcast their user identifier tokens 1 and 2 or user identifier keys to identify other users of the online social network 200. Other authentication protocols can be implemented.

Short-range communication systems such as Bluetooth, Near Field Communication (NFC), RFID, Z-Wave, ZigBee, etc. can establish peer-to-peer (P2P) connection 209 between devices that are in close physical proximity of each other. During a P2P connection 209, devices 208 and 215, when within transmission range of each other, broadcast user identity tokens 1 and 2. In P2P passive or connectionless mode, one of the devices can initiate the broadcast, and other can behave as a receiver without pairing. In P2P active mode, in which the devices are paired or have built a connection, both devices 208 and 215 can transmit and receive identity tokens 1 and 2.

WLAN 211 such as Wi-Fi, can connect the devices 208 and 215 to AP 210 using medium range signals. During WLAN connection 211, devices 208 and 215 can operate in broadcast (connectionless) or connected modes. In a broadcast mode, broadcasting devices 208 and 215 connected to a shared AP 210 can be presumed to be in close proximity. Tokens can, for instance, be broadcast to MAC address or to another MAC or IP address of a defined network segment scope. Broadcasting to a MAC address is supported by IPv4 and IEEE 802.11. In IPv6, multicasting takes the place of broadcasting. Tokens can be embedded in recognized broadcast message types. One example of a broadcast protocol is Internet Control Message Protocol, which is implemented in both IPv4 and IPv6. ICMP messages of various types could be used or a new type chosen from the reserved range of type codes. Another example of a broadcast protocol supported by IPv4 is the address resolution protocol (ARP). Query messages can be used to scan a WLAN segment 211. From responses to a query, a list of unique media access control (MAC) addresses of connected devices can be compiled. In IPv6, the neighborhood discovery protocol (NDP) specifies a variety of multicast message types that could be adapted for transmitting identity token information. When the devices 208 and 215 can broadcast ARP messages or user identity tokens 1 and 2, the AP can forward the broadcasts to other connected devices. In some implementations, multiple APs covering a single location, such as a large meeting room, can be relay broadcasts as a group or can be treated as a single AP.

Connection Events

Upon receiving user identity tokens, the devices 208 and 215 can store the tokens in their local memory units and automatically or manually upload them to server 225 connected to an identity token database 222. The server 225 can use identity tokens individually or in aggregate to create a physical connection event in the connection event database 221.

In some implementations, the system or users 110 and 112 can set a threshold or timeout limit to help the mobile devices aggregate physical connection events resulting from successive reception of the same user identity token. In aggregated physical connection events resulting from reception of multiple user identity tokens, user identity tokens with higher counts, lengthier timestamps readings, or greater received signal strengths indications (RSSI) can indicate sustained and close proximity of two devices.

Aggregation can be performed on the devices 208 and 215, the server 225, or both. For instance, the devices 208 and 215 may aggregate received user identity tokens to determine a timestamp duration. In some implementations, failure to receive a user identity token from a broadcasting device within a pre-set time window can cause the receiving device to close and summarize a connection event. After a timeout duration without receiving further user identity tokens, the devices 208 and 215 may forward the batch of collected user identity tokens and associated metadata including timestamp durations and RSSI values to the server 225. The devices 208 and 215 can indicate the quality of a transmission as "strong" or "average" based on the number of collected user identity tokens and the associated metadata values. The quality of a broadcast can indicate close proximity of the broadcasting device and be used by the sever 255 for interaction strength calculation. In other implementations, aggregation of subsequent user identity tokens can be limited by the server.

The aggregated physical connection events and corresponding calendar connection events can be used to calculate a level of physical interactions (explained later). The calculated level of physical interactions can be depicted through an interaction strength metric on the social profile 105 of John Doe 110. The social profile 105 can be accessed from a browser 255 running on the computing device 235 and being tracked by an observer tool 245. The browser 255 can be Chrome, Internet Explorer, Firefox, Safari, etc. or the like that is capable of sending and receiving information to and from the server 225. In some implementations, the server 225 can apply a filter to calendar connection events and received user identity tokens for identifying particular events or user properties desired by the users 110 and 112.

In some implementations, the devices 208 and 215 can use Bluetooth technology, which can include an identification phase and a pairing phase. During the identification phase, the broadcasting device 208 can set a frequency-hopping pattern, to which the device 215 can synchronize its signals. In the pairing phase, the device 208 and 215 can transmit low power short-range RF signals and broadcast user identity tokens 1 and 2. Alternatively, tokens can be received and processed without pairing in a connectionless mode.

In other implementations, the devices 208 and 215 can use NFC for ultra-short-range communication and replace the identification phase of the Bluetooth technology with a simple tap between the devices 208 and 215. In case of NFC, antennas 205 and 212 can function as windings of a transformer to generate high power ultra-short-range RF signals for broadcasting user identity tokens 1 and 2.

In other implementations, the devices 208 and 215 can participate in the WLAN 211 through Wi-Fi, via an AP 210 that broadcasts a Wi-Fi signal usable over a medium-range area. In response to a MAC address based ARP scan initiated by devices 208 and 215, the AP 210 can generate a list of devices connected to it along with their MAC address, names, format, Internet Protocol (IP), etc. The devices 208 and 215 can then use the user identity tokens to filter those devices from the list whose users are in the same online social network environment as those of devices 208 and 215.

FIG. 3 illustrates one implementation of an example system 300 that allows mapping of relevant personal connections. In FIG. 3, the components are configured to operate within an execution environment hosted by a device and/or multiple devices, as in a distributed execution environment. Exemplary computing devices can include desktop computers, servers, networking devices, notebook, computers, PDAs, mobile phones, digital image capture devices and the like. The wireless devices 208 and 215 and computing devices 1 and 2 can be communicatively coupled to one another via network 315. The network 315 may be any network or combination of networks of devices that communicate with one another. For example, network 315 can be any one or any combination of Local Area Network (LAN), Wide Area Network (WAN), telephone network, wireless network, point-to-point network, star network, token ring network, hub network, or other appropriate configuration including the Internet.

The calendar entries store 301 can store the calendar entries, event subscriptions, and sign-ins of the users 110 and 112, which are matched in the calendar engine 305 to create or capture calendar connection events after locating a scheduled physical connection by finding a coincidence of scheduling, registration or check-in information in electronic records of the users 110 and 112. The calendar connection event can correspond to information stored with the physical connection event in time or location. If the timestamp and location recordings related to a physical connection event matches the time and venue entries associated with a scheduled connection event, then the two connection events can be presumed to correspond to each other.

The connection events can be further stored in the calendar events store 309. The social network engine 310 can provide online social applications that store the social profiles of the users 110 and 112. The interaction engine 319 can calculate the level of physical interaction between the users 110 and 112 by matching the corresponding physical and calendar connection events. The user profile database 320 can include the user identity tokes 1, 2, and 3 of users 110 and 112.

Physical Interactions Level

FIG. 4 is a flow chart 400 of one implementation of calculating a level of physical interactions between first user 110 using first device 208 and second user 112 using second device 215 communicating via P2P connection 209. Other implementations may perform the steps in different orders and/or with different, fewer or additional steps than the ones illustrated in FIG. 4. Multiple steps can be combined in some implementations. For convenience, this flowchart is described with reference to the system that carries out a method. The system is not necessarily part of the method.

As explained above, when in close proximity with each other, first and second devices 208 and 215 broadcast short-range RF signals at step 407. The user identity tokens 1 and 2 of respective users 110 and 112 that include users' social identities are broadcasted through the broadcast signals at step 415. If the users are members of the online social network 200, a physical connection event is registered in the connection event database 221 at step 417. At step 425, the timestamps of the first and last reception of user identity tokens 1 and 2 can be used to record the broadcast durations. The RSSI values of the broadcasts can be recorded at step 427, quantifying the quality of broadcasts with each devices 208 and 215. At step 435, the presumption of contact or likely contact between the users 110 and 112 is narrowed based on the broadcast durations and RSSI values, with longer broadcasts and higher RSSI values suggesting greater proximity between users 110 and 112. The electronic records of the users 110 and 112 pertaining to calendar entries, event subscriptions, sign-ins and the like that place two users at the same event are matched at step 437. A find or a match creates a calendar connection event in the connection event database 221 at step 445.

As explained above, the connectedness of aggregated physical connection events with calendar connection events is optionally confirmed at step 447 on the basis of their respective time and location fields. The connectedness confirmation is approved by the users 110 and 112 at step 455 to ensure that they actually attended the events whose calendar entries and the like created the calendar connection events. At step 457, a level of physical interaction between the users 110 and 112 is calculated by the interaction engine 319 based on the aggregated physical connection events and the corresponding calendar connection events.

Following this, at steps 465 and 467, filtering mechanisms are implemented to the calendar connection events and received user identity tokens 1 and 2 for identifying particular events or user properties. At step 475, the social profiles of the users 110 and 112 are modified on the online social network 200 through an interaction strength metric using scoring functions, point systems, meters, graphical enhancements, etc.

FIG. 5 is a message exchange chart 500 of one implementation of some elements of FIG. 4. At exchange 532, first device 208 sends the user identity token 1 of the first user 110 to second device 215. The second device 215 relays the received user identity token 1 to the server 225 at exchange 534, which stores it in the identity token database 221 and identifies the user associated with it. At exchange 553, second device 215 transmits the user identity token 2 of the second user 112 to first device 208. The first device 208 relays it to the server 225 for the same "social identity analysis" as at exchange 534. The RSSI values and broadcast durations are reported to the server 225 at exchanges at 563 and 565. At exchanges 565 and 575, the server 225 sends the connectedness confirmation inquiry to the users 110 and 112 via their respective devices 208 and 215. The users 110 and 112 then approve the connectedness confirmation at exchanges 585 and 587. Following this, the server 225 sends the level of physical interactions between the users 110 and 112 calculated by interaction engine 319 to the respective devices 208 and 215 at exchanges 595 and 597.

FIG. 6 is a flow chart 600 of one implementation of calculating a level of physical interactions between first user 110 using first device 208 and second user 112 using second device 215 communicating via WLAN 211. Other implementations may perform the steps in different orders and/or with different, fewer or additional steps than the ones illustrated in FIG. 6. Multiple steps can be combined in some implementations. For convenience, this flowchart is described with reference to the system that carries out a method. The system is not necessarily part of the method.

As explained above, the first and second devices 208 and 215 wirelessly discover other proximate devices. This discovery can be connectionless or connected, as between wireless devices, each of which is connected to AP 210 at step 607. In some implementations, a MAC-based ARP scan can be part of the discovery. To reduce potential intrusiveness, the devices 208 and 215 optionally can broadcast user identity tokens 1 and 2 to just those devices whose users are members of the online social network 200. If first user identity token 1 being broadcasted by first device 208 confirms the membership of user 110 in the online social network 200, then it is collected by first device 215 at step 615. Also at step 615, The second device 215 broadcasts a second user identity token 2, which is filtered against the profiles stored in the user profile database 320 by the server 225 to confirm that the second user 112 is a member of the online social network 200. With the reception of the user identity tokens, physical connection events are registered in the connection event database 221 at step 617. At step 625, the timestamps of the first and last reception of user identity tokens 1 and 2 are used to record the broadcast durations. The RSSI values of the broadcasts are recorded at step 627, quantifying the quality of broadcasts with each devices 208 and 215.

At step 635, the presumption of contact or likely contact between the users can be narrowed based on the broadcast durations and RSSI values, with longer broadcasts and higher RSSI values suggesting greater proximity between users. The electronic records of the users pertaining to calendar entries, event subscriptions, sign-ins and the like that place two users at the same event are matched at step 637. A find or a match creates a calendar connection event in the connection event database 221 at step 645.

As explained above, the connectedness of aggregated physical connection events with calendar connection events confirmed at step 647 on the basis of their respective time and location fields. The connectedness confirmation is approved by the users 110 and 112 at step 655 to ensure that they actually attended the events whose calendar entries and the like created the calendar connection events. At step 657, a level of physical interaction between the users is calculated by the interaction engine 319 based on the aggregated physical connection events and the corresponding calendar connection events. Following this, at steps 665 and 667, filtering mechanisms are implemented to the calendar connection events and received user identity tokens for identifying particular events or user properties. At step 675, the social profiles of the users are modified on the online social network 200 through an interaction strength metric using scoring functions, point systems, meters, graphical enhancements and the like.

FIG. 7 is a message exchange chart 700 of one implementation of some elements of FIG. 6. Optionally, the first device 208 sends a device discovery request to AP 210 at exchange 702. The AP 210 reports a list of devices discovered on its network to the first device 208 at exchange 706, including the second device 215.

Using the AP MAC address of the second device 215 obtained from the discovery report, the first device 208 sends the first user identity token 1 to the second device 215 at exchange 707. The second device 215 relays the first user identity token 1 to the server 225 at exchange 709. Optionally, it can check if the user 110 associated with the first identity token 1 is a member of the online social network 200. If the server 225 confirms that user 110 is a member of the online social network 200, then the second device 215 broadcasts the second user identity token 2 to the first device 208 at exchange 713. The first device 208 forwards the second identity token to the server 225 at exchange 718 to make the same identity check done by second device 215 at exchange 710. The RSSI values and broadcast durations are reported to the server 225 at exchanges at 719 and 721. At exchanges 722 and 725, the server 225 sends the connectedness confirmation inquiry to the users 110 and 112. The users 110 and 112 then approve the connectedness confirmation at exchanges 728 and 730. Following this, the server 225 sends the level of physical interactions calculated by interaction engine 319 to the devices 208 and 215 at exchanges 733 and 734.

The concept of calculating a level of physical interactions between users can be further explained through an example scenario of a Dreamforce conference. The users 110 and 112 of the online social network 200 using devices 208 and 215 can enable Bluetooth, NFC, or Wi-Fi in their respective devices while attending Dreamforce conference. The users 110 and 112 can then broadcast their user identity tokens when their devices are within the transmission range of the enabled wireless network. The devices 208 and 215 can assign timestamps to the received user identity tokens and track the duration and RSSI values of the broadcast, which can be uploaded to the server 225 to create a physical connection event in the on-demand database 221.

Further on, while attending another event like a training workshop, the users 110 and 112 can again exchange their user identity tokens when their devices are within the transmission range of the enabled wireless network and create another physical connection event. If the aggregation of physical connection events crosses the pre-defined threshold counter due to repeated reception of the same user identity token, the users 110 and 112 can exchange the electronic records stored in their respective devices 208 and 215 such as social profiles, social check-ins, calendar entries, event subscriptions, etc.

Following this, the calendar engine 305 can match the calendar related electronic records to find any events co-attended by the users 110 and 112 and create a calendar connection event. The aggregated physical connection events and corresponding calendar connection events can then be used to calculate a level of physical interactions between the users 110 and 112, which can be depicted through an interaction strength metric on Chatter, Facebook, or Twitter profiles of the users 110 and 112.

In some implementations, the server 225 can request the users 110 and 112 to confirm the connectedness between the aggregated physical connection events and corresponding calendar connection events. In some implementations, the server 225 can apply a filter to the calendar connection events and received user identity tokens for identifying particular events such as an important internal meetings or user properties like similar work backgrounds, professional titles, etc.

Observer Tool

The devices 208 and 215 can establish wireless communications across various channels including audio, video, and text. For example, the devices 208 and 215 can communicate with each other over cellular networks including code division multiple-access (CDMA), global system for mobile communications (GSM), Enhanced Data GSM Environment (EDGE), long-term evolution (LTE), etc. Similarly, the devices 208 and 215 can establish a wireless local area network (LAN) such as Wi-Fi, personal area network like Bluetooth or NFC, etc. Other communication protocols can also be implemented.

For example, the first user 110 can interact with a second user 112 on Chatter, but can interact more heavily with the second user 112 on Facebook or Twitter, or in a social gaming environment such as that provided by Zynga, or can physically or proximally interact with the second user 112 as evidenced by common check-ins on Foursquare or other location-based social networking systems. In other implementations, interaction strength can also be based upon one or more physical interactions that also implement features common to mobile communication devices, such as smartphones, tablet computers, etc.

The observer tool 245 can track wireless interactions between the users 110 and 112 via the devices 208 and 215. It can extract user activity history from web browsers, call logs, applications cache, memory units, etc. to identify—the users in the interaction, the channel communication of the interaction, and the duration of the interaction. This information can then be sent to the server 225, which is in communication with the devices 208 and 215 to create connection events. The server 225 can then calculate a level of wireless interactions based on one or more wireless connection events that can be used to modify the social profiles of users 110 and 112 through an interaction strength metric.

FIG. 8 is a flow chart 800 of one implementation of calculating a level of wireless interactions between first user 110 and second user 112 communicating via first device 208 and second device 215. Other implementations may perform the steps in different orders and/or with different, fewer or additional steps than the ones illustrated in FIG. 8. Multiple steps can be combined in some implementations. For convenience, this flowchart is described with reference to the system that carries out a method. The system is not necessarily part of the method.

At step 805, a wireless connection is established between the devices 208 and 215 over audio, video, text communication channel. Following this, the observer tool 245 and a timer is activated to track and time wireless interactions between the users 110 and 112 via the devices 208 and 215 at step 815. The duration of the connection is recorded at step 825 using the timer and the channel of communication is recorded at step 835. The wireless interactions are filtered at step 845 based on the length and type of the interaction. In some implementations, a gradation is applied to audio, video, text interactions, with video interactions being "strongest", audio interactions "average" and text interactions "weakest." In other implementations, the length of the interactions and amount of data transferred during an interaction is considered during gradation. As a result, wireless connection event is created at step 855, which is stored in the connection event database 221. At step 865, interaction engine 329 calculates a level of wireless interactions based on the number and gradation of wireless connection events. At step 875, the social profiles of the users 110 and 112 are modified using an interaction strength metric based on the calculated level of wireless interactions.

FIG. 9 is a message exchange chart 900 of one implementation of some elements of FIG. 8. At exchange 905, users 110 and 112 interact across a voice communication channel and the duration of the interaction is reported to the server 225 at exchange 909. As a result, the first wireless connection event is created at exchange 919. Similarly, an audio interaction and its duration are recorded at exchanges 925 and 939 to create the second wireless connection event at exchange 949. Likewise, at exchange 955 a text interaction between the users 110 and 112 is recorded and its duration is reported to the server 225 at exchange 969. Consequently, the third wireless connection event is created at exchange 929. The server 225 calculates a wireless interactions level at exchange 989 on the basis of the count and gradation of received wireless connection events, which is reported to the devices 208 and 215 at exchange 992.

In a non-limiting example, the observer tool 245 can track interactions between the users 110 and 112 made through voice calls, SMSs, and Skype video calls along with their durations. The observer tool 245 can then upload the tracked interactions to the remote server 225, with each upload creating a wireless connection event in the server 225. Using the number and gradation of wireless connection events, the interaction engine 319 can calculate a level of wireless interactions between the users 110 and 112. As a result, the Chatter, Facebook, or Twitter profiles of the users 110 and 112 can be modified using a interaction strength metric based on the calculated level of wireless interactions.

Some Particular Implementations

In one implementation, a system is described for calculating real-world user interactions between first and second users connected in an online social environment that includes a processor and code stored in memory coupled to the processor, which when executed on a processor creates a physical connection event stored in memory that represents contact or likely contact between the first and second users when first and second wireless devices carried by the first and second users establish a peer-to-peer relationship using a direct wireless channel, calculates a level of physical interactions between the first and second users including at least aggregating the plurality of physical connection events, updates the level of physical interactions in memory, and modifies social profiles of the first and second users using an interaction strength metric based on the level of physical interactions.

This system and other implementations of the technology disclosed can each optionally include one or more of the following features and/or features described in connection with additional systems disclosed. In the interest of conciseness, the combinations of features disclosed in this application are not individually enumerated and are not repeated with each base set of features. The reader will understand how features identified in this section can readily be combined with sets of base features identified as implementations.

The system can further include physical connection event to record a duration of connection via the direct wireless channel and a pattern of received signal strength during the connection via the direct wireless channel. It can include the contact or likely contact being filtered by duration of connection and strength of received signal when multiple direct wireless channels are simultaneously active.

The system can further include code stored in memory coupled to the processor, which when executed on a processor further locates a scheduled physical connection by finding a coincidence of scheduling, registration or check-in information in electronic records of the first and second users, creating a calendar connection event, and including in the calculating of the level of physical interactions between the first and second users an aggregation of the plurality of physical connection events.

The system can further include code stored in memory coupled to the processor, which when executed on a processor further confirms interaction strength of the physical connection event based on the calendar connection event, wherein the calendar connection event corresponds in at least time or location to information stored with the physical connection event.

The system can further include code stored in memory coupled to the processor, which when executed on a processor further applies a filtering mechanism to the calendar connection event to identify scheduling, registration or check-in information in electronic records of the second user that meets criteria set by the first user.

The system can further include code stored in memory coupled to the processor, which when executed on a processor further receives from at least one of the first and second users a response to a query confirming connectedness of the physical connection event. It can include the first and second devices that are configured to automatically exchange user identity tokens that are meaningful to an interaction server cooperating with the online social environment.

The system can further include code stored in memory coupled to the processor, which when executed on a processor further receives from at least one of the first and second wireless devices at least one user identity token received in an automatic exchange. It can include the privacy of the user identity tokens to be limited by user selectable privacy criteria.

The system can further include code stored in memory coupled to the processor, which when executed on a processor further applies a filtering mechanism to the user identity tokens to identify user identity information of the second user that meets criteria set by the first user.

Other implementations may include a non-transitory computer readable storage medium storing instructions executable by a processor to constitute a system as described above. Yet another implementation may include a method performed by the system as described above.

In another implementation, a system is described for calculating real-world user interactions between first and second users connected in an online social environment that includes a processor and code stored in memory coupled to the processor, which when executed on a processor creates a physical connection event stored in memory that represents contact or likely contact between the first and second users using first and second wireless devices sharing a common wireless local area network access point, calculates a level of physical interactions between the first and second users including at least aggregating the plurality of physical connection events, updates the level of physical interactions in memory, and modifies social profiles of the first and second users using an interaction strength metric based on the level of physical interactions.

Other implementations may include a non-transitory computer readable storage medium storing instructions executable by a processor to constitute a system as described above. Yet another implementation may include a method performed by the system as described above.

In another implementation, a system is system for calculating wireless user interactions between first and second users using wireless devices that includes a processor and code stored in memory coupled to the processor, which when executed on a processor activates an observer tool to track at least an interaction between the first and second users via the first and second wireless devices across at least a video, audio, or text communication channel, creates a wireless connection event stored in memory that represents wireless interactions between the first and second users via first and second wireless devices, calculates a level of wireless interactions between the first and second users including at least aggregating plurality of wireless connection events, updates the level of wireless interactions in memory, and, modifies social profiles of the first and second users using an interaction strength metric based on the level of wireless interactions This system and other implementations of the technology disclosed can each optionally include one or more additional features described.

The system can further include wireless interactions that are filtered by a duration of interaction and the type of communication channel used for the interaction.

Each of the following patent applications is hereby incorporated by reference in its entirety and for all purposes: U.S. patent application Ser. No. 15/268,201, titled "Displaying Aggregated Connection Data Using a Database System," by Harris et al., filed on Sep. 16, 2016, U.S. patent application Ser. No. 13/743,895, titled "Systems and Methods for Mapping Relevant Personal Connections," by Harris et al., filed on Jan. 17, 2013, and U.S. Provisional Patent Application No. 61/579,098, titled "Systems and Methods for Mapping Relevant Personal Connections," by Harris et al., filed on Jan. 17, 2012.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A database system for displaying aggregated connection data, the database system comprising:

a server system comprising one or more hardware processors, the server system configurable to cause:

maintaining a database storing data objects identifying connection events, each connection event representing contact or likely contact between users of a social networking system;

processing an indication of a first connection event between first and second users of the social networking system;

storing, responsive to processing the indication of the first connection event, a record of the first connection event in the database, the record of the first connection event being one of a plurality of records of connection events between the first and second users stored in the database;

processing the plurality of records to determine a plurality of levels of interaction strength between the first and second users, each of the levels of interaction strength corresponding to a respective interaction type; and displaying, in a user interface on a display of a first device associated with the first user, an interaction strength presentation comprising:
an identification of the first user,
an identification of the second user, and
indications of the plurality of levels of interaction strength between the first and second users, the indications of each of the levels of interaction strength between the first and second users comprising an identification of the respective interaction type.

2. The database system of claim 1, wherein:
processing the indication of the first connection event comprises identifying establishment of a connection, via a direct wireless channel, between the first device and a second device associated with the second user, and
the record of the first connection event comprises data indicating a duration of the connection between the first and second wireless devices.

3. The database system of claim 2, wherein the record of the connection event further comprises data indicating a pattern of received signal strength during the connection via the direct wireless channel.

4. The database system of claim 2, wherein the first device is configured to automatically transmit and/or receive a first user identity token, the first user identity token being one of a plurality of user identity tokens provided by the social networking system, each user identity token comprising encrypted data unique to a respective user of the social networking system, the first user identity token corresponding to a signal transmitted by the first device.

5. The database system claim 1, the server system further configurable to cause:
generating a second connection event by processing calendar data of the first and second users to identify a coincidence of scheduling, registration or check-in information,
storing, responsive to processing the indication of the second connection event, a record of the second connection event in the database.

6. The database system of claim 5, the server system further configurable to cause:
validating a first one of the levels of interaction strength between the first and second users based on calendar information associated with the second connection event, the calendar information comprising time or location information associated with the second connection event.

7. The database system of claim 5, the server system further configurable to cause:
applying a filtering mechanism to the second connection event to identify scheduling, registration or check-in information in electronic records of the second user that meets criteria set by the first user.

8. The database system of claim 1, the server system further configurable to cause:
processing a response to a query received from at least one of the first and second users, the response to the query confirming the first connection event.

9. The database system of claim 1, wherein the interaction types include one or more of: a physical interaction, a calendar interaction, a wireless interaction, a desktop interaction.

10. A method of displaying aggregated connection data, the method comprising:
maintaining, using the database system, a database storing data objects identifying connection events, each connection event representing contact or likely contact between users of a social networking system;
processing an indication of a first connection event between first and second users of the social networking system;
storing, responsive to processing the indication of the first connection event, a record of the first connection event in the database, the record of the first connection event being one of a plurality of records of connection events between the first and second users stored in the database;
processing the plurality of records to determine a plurality of levels of interaction strength between the first and second users, each of the levels of interaction strength corresponding to a respective interaction type; and
causing display of, in a user interface on a display of a first device associated with the first user, an interaction strength presentation comprising:
an identification of the first user,
an identification of the second user, and
indications of the plurality of levels of interaction strength between the first and second users, the indication of each of the levels of interaction strength between the first and second users comprising an identification of the respective interaction type.

11. The method of claim 10, wherein:
processing the indication of the first connection event comprises identifying establishment of a connection, via a direct wireless channel, between the first device and a second device associated with the second user, and
the record of the first connection event comprises data indicating a duration of the connection between the first and second wireless devices.

12. The database system of claim 11, wherein the record of the connection event further comprises data indicating a pattern of received signal strength during the connection via the direct wireless channel.

13. The method of claim 11, wherein the first device is configured to automatically transmit and/or receive a first user identity token, the first user identity token being one of a plurality of user identity tokens provided by the social networking system, each user identity token comprising encrypted data unique to a respective user of the social networking system, the first user identity token corresponding to a signal transmitted by the first device.

14. The method of claim 1, further comprising:
generating a second connection event by processing calendar data of the first and second users to identify a coincidence of scheduling, registration or check-in information,
storing, responsive to processing the indication of the second connection event, a record of the second connection event in the database.

15. The method of claim 14, further comprising:
validating a first one of the levels of interaction strength between the first and second users based on calendar information associated with the second connection event, the calendar information comprising time or location information associated with the second connection event.

16. The method of claim 14, further comprising:
applying a filtering mechanism to the second connection event to identify scheduling, registration or check-in information in electronic records of the second user that meets criteria set by the first user.

17. A computer program product comprising computer-readable program code capable of being executed by one or more processors when retrieved from a non-transitory computer-readable medium, the program code comprising instructions configurable to cause:
maintaining, using a database system, a database storing data objects identifying connection events, each connection event representing contact or likely contact between users of a social networking system implemented using the database system;
processing an indication of a first connection event between first and second users of the social networking system;
storing, responsive to processing the indication of the first connection event, a record of the first connection event in the database, the record of the first connection event being one of a plurality of records of connection events between the first and second users stored in the database;
processing the plurality of records to determine a plurality of levels of interaction strength between the first and second users, each of the levels of interaction strength corresponding to a respective interaction type; and
displaying, in a user interface on a display of a first device associated with the first user, an interaction strength presentation comprising:
an identification of the first user,
an identification of the second user, and
indications of the plurality of levels of interaction strength between the first and second users, the indication of each of the levels of interaction strength between the first and second users comprising an identification of the respective interaction type.

18. The computer program product of claim 17, wherein:
processing the indication of the first connection event comprises identifying establishment of a connection, via a direct wireless channel, between the first device and a second device associated with the second user, and
the record of the first connection event comprises data indicating a duration of the connection between the first and second wireless devices.

19. The computer program product of claim 18, wherein the record of the connection event further comprises data indicating a pattern of received signal strength during the connection via the direct wireless channel.

20. The computer program product of claim 18, wherein the first device is configured to automatically transmit and/or receive a first user identity token, the first user identity token being one of a plurality of user identity tokens provided by the social networking system, each user identity token comprising encrypted data unique to a respective user of the social networking system, the first user identity token corresponding to a signal transmitted by the first device.

* * * * *